May 15, 1934.　　　　　C. HARRISON　　　　　1,958,997
PROPELLING AND STEERING UNIT FOR AMUSEMENT BOATS
Filed Aug. 24, 1932

INVENTOR:
Charles Harrison.
By, Chatwin & Company Attys.

Patented May 15, 1934

1,958,997

UNITED STATES PATENT OFFICE 1,958,997

PROPELLING AND STEERING UNIT FOR AMUSEMENT BOATS

Charles Harrison, London, England, assignor of one-half to British Motor Boat Manufacturing Company, Limited, London, England Application August 24, 1932, Serial No. 630,213 In Great Britain February 1, 1932

3 Claims. (Cl. 115—18)

The invention relates to amusement boats, often known as amusement speed boats, and has for its object to provide a direct geared steering means such that the steering wheel may carry an indication showing the exact position for forward and reverse movement of the boat and so on the arrangement being such as to give a self contained power and steering unit, the whole construction being compact and simple so as to be readily fitted or removed from the boat.

In order to obtain a forward and reverse movement of the boat by a half turn of the steering wheel there must be a 1 to 1 drive and according to the invention, in order to keep the apparatus within compact limits, the driving shaft is provided with a sprocket or toothed wheel adapted to coact with a similar sized sprocket or toothed wheel carried on another or second spindle advantageously disposed near the driving spindle, said spindle being supported in an appropriate bearing such as a column, a bevel wheel being mounted above said sprocket wheel on the second spindle and adapted to mesh with a similar bevel wheel on the end of the steering spindle mounted in its column.

Figure 1:
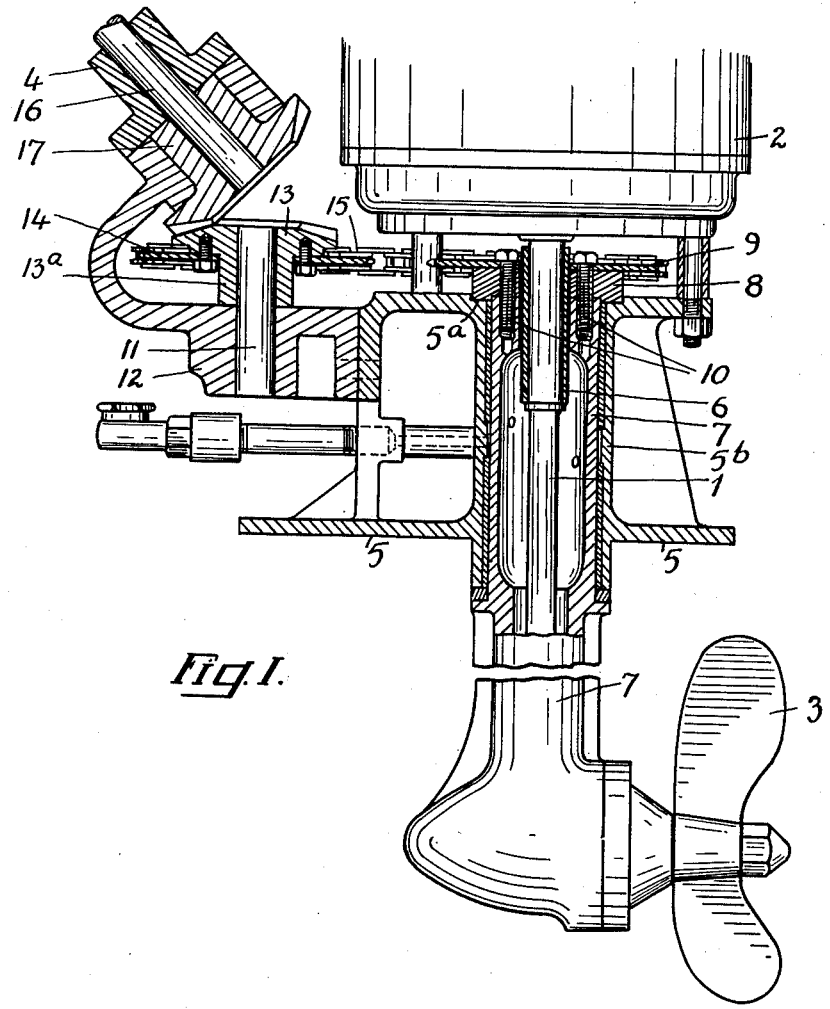
Figure 2:
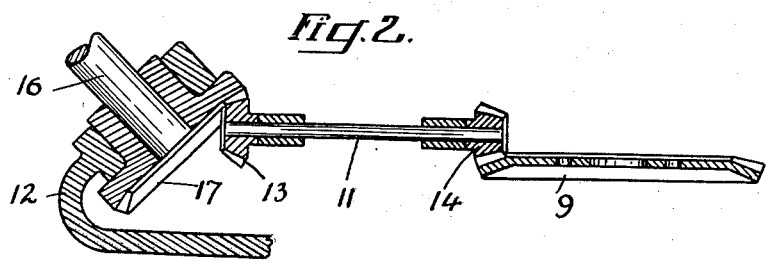

In order that the invention may be more clearly understood we will now describe the same by the aid of the accompanying drawing in which Figure 1 is a sectional elevation of an apparatus constructed according to the present invention and Figure 2 is a section of part thereof illustrating a modification.

Referring to Figure 1, 1 represents the driving shaft, 2 represents the motor stand or member, 3 represents the propeller, 4 represents the steering column and 5 represents a frame or the like mounted in any suitable position in the boat by any suitable means.

Carried by or suspended from said frame 5 or other suitable means with capability of rotation is a propeller casing or column 7 which is provided with a bearing surface which bears against a coacting bearing surface or sleeve 6 fixed upon the driving spindle or shaft 1 to prevent said propeller column or casing 7 rocking.

In the example shown the propeller column or casing 7 is suspended from the frame 5 by means of a bearing member 8 upon which is mounted a sprocket or chain wheel 9 which is bolted to the propeller column or casing 7 by means of bolts 10 or otherwise a bearing 5a being provided upon the frame 5 and the arrangement is such that upon movement being imparted to the sprocket wheel 9 said movement is communicated to the propeller casing or column 7 which in the example shown is housed in an outer column or casing 5b in the frame 5. The rotary motion of the driving spindle or shaft 1 is imparted to the propeller 3 by any suitable gearing (not shown) preferably by bevel gearing in the well known manner.

Mounted, preferably near the driving spindle or shaft 1 is another or second spindle 11 which is supported in a bearing in a bracket 12 fixed to the frame 5; or said bracket might be an integral part of the frame 5 as will be readily understood. Or said spindle 11 might be mounted in a column or other suitable means and situated at other suitable distance from the frame 5 and the driving spindle 1.

Mounted upon the upper end of the spindle 11 is a bevel wheel 13 preferably having a long hub 13a embracing the spindle 11 and upon the hub 13a is fixed a sprocket wheel 14 bolted, or it might be otherwise fixed as regards rotation, to the bevel wheel 13 and said sprocket wheel mounted in alignment with the sprocket wheel 9 and connected therewith by a chain 15.

Instead of the sprocket wheels 9 and 14 grooved or other suitable wheels might be substituted therefor the chain 15 in that case being replaced by a belt, strap or the like formed of any suitable material, for example, leather, wire rope or the like.

16 represents the steering spindle which is mounted in the usual manner in the steering column 4 and upon said spindle 16 is fixed a bevel wheel 17 (or it might be any other suitable wheel) which meshes with the bevel wheel 13 in such manner that the motion of the steering spindle 16 is communicated through the bevel wheel 13, sprocket wheel 14, chain 15, sprocket wheel 9, to the propeller column or casing 7 by which means the propeller 3 may be turned through any desired angle into any desired position for the purpose of steering the boat forward or backward.

In the modification illustrated in Figure 2 the sprocket wheels 9 and 14, chain 15 and second spindle 11 are dispensed with and are substituted by the following arrangement of parts.

Upon the bearing member 8 supporting the propeller casing or column 7 is mounted a bevel wheel 9 in place of the sprocket wheel 9 shown in Figure 1 and gearing with said bevel wheel 9 is a bevel pinion or wheel 14 fixed on the end of a shaft or spindle 11 upon the other end of which is mounted a bevel pinion or wheel 13 which is in mesh with the bevel wheel 17 upon the steering spindle 16 said shaft or spindle 11 being mounted in suitable bearings upon the bracket 12 or other fixed part.

The rotary motion of the bevel wheel 17 is communicated to the bevel pinion or wheel 13, through the shaft 11 to the pinion 14 which communicates said motion to the bevel wheel 9 and thus to the propeller column or casing 7.

Instead of the apparatus being situated in close proximity to the steering column as shown the same may be disposed at any suitable distance therefrom and in any suitable position with relation thereto and if desired any suitable intermediate gearing may be provided for communicating the motion of the wheel 17 to the wheel 13 or otherwise but by the means hereinbefore described it is possible to bring the driving spindle 1 with its motor in close proximity to the steering gear and so form a self contained unit as aforesaid which will not occupy great space in the boat.

Moreover with such a device it will be much easier for the public using such amusement boats, to steer them to better advantage or more accurately than is possible with the usual friction drive type of apparatus where it was impossible to provide an indication for the position of the steering wheel and the user was at a complete loss as to what to do.

It will be understood that the details of construction of the apparatus may be further modified without departing from the principle of the invention.

I claim:—

1. A self-contained portable steering and propelling unit for amusement boats comprising a bodily removable frame, a fixed tubular casing upon said frame, a rotatable column mounted in said tubular casing, a propeller carried by said column and projecting laterally therefrom, an electric motor carried by said frame, the shaft of said motor extending through the column and driving the propeller, a gear element carried by said rotatable column, a vertical spindle mounted in said frame and lying in parallelism with the motor shaft and in spaced relation thereto, a second gear element supported from said vertical spindle, driving means connecting said gear elements, a bracket carried by said frame, a steering spindle mounted in said bracket, a bevel spur wheel carried by said steering spindle, and a bevel spur wheel carried by the gear element of the vertical spindle and meshing with the first named bevel spur wheel, said gearing units being of such proportions with respect to each other as to constitute a one to one gearing between the steering spindle and the rotatable column whereby the rotative position of the steering spindle will always occupy a fixed relation to the angular position of the propeller so that the operator may determine the position of the propeller from the rotative position of the steering spindle.

2. A self-contained portable steering and propelling unit for boats comprising a frame, a tubular member carried by said frame, a rotative column mounted in said tubular member, a propeller carried by said column, a motor supported upon said frame, the shaft of which extends through the column for driving the propeller, a sprocket wheel carried by the rotatable column, a vertical spindle mounted in said frame in forwardly spaced relation to said column, a second sprocket wheel mounted on said vertical spindle, a sprocket chain engaging said sprocket wheels, a bevel spur wheel carried by said vertical spindle, a bracket carried by said frame, a steering spindle mounted in said bracket and a bevel spur wheel carried by said steering spindle and meshing with the bevel spur wheel of the vertical spindle, the gearing constituted by said bevel spur wheels, sprocket wheels and chain constituting a one to one gearing between the steering spindle and the column whereby the rotative position of the steering spindle will always occupy a fixed relation to the angular position of the propeller so that the operator may determine the position of the propeller from the rotative position of the steering spindle.

3. A self-contained portable steering and propelling unit for boats comprising a unitary frame supporting the following instrumentalities for bodily movement together, namely, a fixed tubular member, a rotatable column mounted in said tubular member, a motor, the shaft of which passes through said column, a propeller carried by the rotatable column and driven by said motor shaft, a rotatable steering element, one to one gearing between the steering element and the rotatable column through the medium of which rotation of the steering element is converted into rotation of the rotatable column to move the propeller to varying angular positions around the axis of the rotatable column, the provision of a one to one gearing insuring that the rotative position of the steering element will always occupy a fixed relation to the angular position of the propeller so that the operator may determine the position of the propeller from the rotative position of the steering element.

CHARLES HARRISON.